(12) United States Patent
Fridrich et al.

(10) Patent No.: US 7,006,656 B2
(45) Date of Patent: Feb. 28, 2006

(54) LOSSLESS EMBEDDING OF DATA IN DIGITAL OBJECTS

(75) Inventors: Jessica Fridrich, Vestal, NY (US); Miroslav Goljan, Johnson City, NY (US); Rui Du, Johnson City, NY (US)

(73) Assignee: The Research Foundation of SUNY, Syracuse, NY (US)

( * ) Notice: Subject to any disclaimer, the term of this patent is extended or adjusted under 35 U.S.C. 154(b) by 728 days.

(21) Appl. No.: 09/977,443

(22) Filed: Oct. 15, 2001

(65) Prior Publication Data

US 2003/0081809 A1    May 1, 2003

(51) Int. Cl.
*G06K 9/00* (2006.01)
*G06K 9/36* (2006.01)
*G06K 9/48* (2006.01)
*H04L 9/00* (2006.01)

(52) U.S. Cl. ............ 382/100; 382/166; 382/244; 713/176

(58) Field of Classification Search ......... 382/100, 382/232, 244, 166; 380/210, 252, 287, 54, 380/51, 284; 713/176, 150; 370/522–529; 348/460, 463

See application file for complete search history.

(56) References Cited

U.S. PATENT DOCUMENTS

| | | | | |
|---|---|---|---|---|
| 6,047,374 | A  * | 4/2000 | Barton | 713/150 |
| 6,633,652 | B1 * | 10/2003 | Donescu | 382/100 |
| 6,674,873 | B1 * | 1/2004 | Donescu et al. | 382/100 |
| 6,763,121 | B1 * | 7/2004 | Shaked et al. | 382/100 |
| 2002/0146123 | A1 * | 10/2002 | Tian | 380/234 |

OTHER PUBLICATIONS

Zhu, B. et al., "Media Compression via Data Hiding," IEEE Proc. 31$^{st}$ Asilomar Conf. on Signals, Systems and Computers, Nov. 1997, pp. 647-651.*
Invertible Authentication, Jessica Fridrich.
Lossless Multiresolution Transform for Image Authenticating Watermarking, Benoit Marcq.
Invertible Authentication Watermark for JPEG Images, Jessica Fridrich.
Distortion-Free Data Embedding for Images, Miroslave Goljan.

* cited by examiner

*Primary Examiner*—Amelia M. Au
*Assistant Examiner*—Anthony Mackowey
(74) *Attorney, Agent, or Firm*—Milde & Hofberg LLP

(57) ABSTRACT

Current methods of embedding hidden data in an image inevitably distort the original image by noise. This distortion cannot generally be removed completely because of quantization, bit-replacement, or truncation at the grayscales 0 and 255. The distortion, though often small, may make the original image unacceptable for medical applications, or for military and law enforcement applications where an image must be inspected under unusual viewing conditions (e.g., after filtering or extreme zoom). The present invention provides high-capacity embedding of data that is lossless (or distortion-free) because, after embedded information is extracted from a cover image, we revert to an exact copy of the original image before the embedding took place. This new technique is a powerful tool for a variety of tasks, including lossless robust watermarking, lossless authentication with fragile watermarks, and steganalysis. The technique is applicable to raw, uncompressed formats (e.g., BMP, PCX, PGM, RAS, etc.), lossy image formats (JPEG, JPEG2000, wavelet), and palette formats (GIF, PNG).

17 Claims, 3 Drawing Sheets

LOSSLESS EMBEDDING OF DATA IN DIGITAL OBJECTS

STATEMENT OF GOVERNMENT INTEREST

This invention was made with Government support under F30602-00-1-0521 from the U.S. Air Force. The Government has certain rights in the invention.

BACKGROUND OF THE INVENTION

This invention relates to embedding data into an object that comprises a collection of samples. The samples include a digital representation of an image; audio, video, and other binary files, such as synthetic aperture radar (SAR) images; three-dimensional representations of spatial structures; etc. The original object before embedding is called the cover object; the object with embedded data is called the stego-object.

Applications that embed data can be divided into two groups, depending on the relationship between the embedded message and the cover object. The first group is steganographic applications, where the message has no relationship to the cover object. The only role for the cover object is to mask the very presence of communication. The content of the cover object has no value to either the sender or the decoder. It functions only to mask an embedded secret message. In a steganographic application for covertly communicating, the receiver has no interest in the original object. Thus such applications do not need lossless techniques for embedding data.

There is, however, a second group of applications in which the cover object is itself of interest. To distort the original object permanently by embedding data into it is unacceptable. Either the distortion must be eliminated or a technique found that restores the original object after the data is embedded.

This second group includes digital watermarking, watermarking for authentication and tamper detection, watermarking for distribution and access control, watermarking for broadcast monitoring, fingerprinting, and image augmentation. In a typical watermarking application, the hidden message has a close relation to the cover object. The hidden message may supply additional information about the cover object, e.g., its caption, ancillary data about its origin, author, sender, or recipient, a digital signature, an authentication code, etc.

Though hiding a message in the object increases its practical value, the act of embedding inevitably introduces some distortion. This distortion should be as small as possible consistent with meeting other requirements, such as minimal robustness and sufficient payload. Employing models of the human visual or audio system helps make the distortion from embedding less detectable to a human.

There are, however, some applications for which any distortion of the object is unacceptable, no matter how minimal. A good example is a medical image, where even the smallest modification cannot be allowed, both for legal reasons and to eliminate a potential risk that a physician will misinterpret an image. Other examples come from law enforcement and the military, where analysts inspect images and videos under special conditions. Under these conditions, which include extreme zoom, iterative filtering, and enhancement, common assumptions about the effects of distortion on visibility do not apply. Only a complete absence of distortion can satisfy the requirements placed on such an image.

Techniques for embedding data, especially high-capacity data, generally introduce some distortion into the original object. Such distortion is permanent; it cannot be reversed. As an example, take simple Least Significant Bit (LSB) embedding, which irreversibly replaces the LSB plane with the message bits.

The concept of embedding data losslessly appears in a patent assigned to The Eastman Kodak Company (Honsinger et al., Lossless Recovery of an Original Image Containing Embedded Data, U.S. Pat. No. 6,278,791, issued Aug. 21, 2001). The inventors describe a fragile invertible method of authentication based on a robust watermark in the spatial domain. Their technique for watermarking is spatial, additive, and non-adaptive; the lossless embedding was achieved by replacing regular addition by addition modulo 256. This type of addition will, however, introduce some disturbing artifacts that resemble a correlated salt-and-pepper noise when pixels with grayscales close to zero are modified to values close to 255 and vice versa. Another drawback of this technique is that its payload must be very small. Thus this technique is not suitable for general data embedding. Finally, the technique is not easily expandable to other image formats and different data types (audio, for example). A more detailed analysis and further generalization of this technique can be found in J. Fridrich et al., "Invertible Authentication," *Proc. SPIE, Security and Watermarking of Multimedia Contents* (San Jose, Calif., January 2001).

A different technique for lossless authentication and lossless embedding of data, based on lossless compression of bit-planes, starts with the lowest bit-plane and calculates its redundancy, defined as the difference between the number of pixels and the same bit-plane compressed with the JBIG lossless compression method (see K. Sayood, *Introduction to Data Compression* (San Francisco, 1996), 87–94) or some other method. Then the embedding method proceeds to higher bit-planes till the redundancy becomes greater or equal to the payload that needs to be embedded. If this technique is used for authentication, only 128 bits (for MD5 hash—see Bruce Schneier, *Applied Cryptography*, 2 ed. (NY, 1996)) need to be embedded. Most high quality images can be authenticated in the lowest three bit-planes. Noisy images may require the $4^{th}$ or the $5^{th}$ bit-plane.

The capacity of this technique can be traded for distortion by choosing different bit-planes, but the artifacts can quickly become visible depending on the length of the message and the noisiness of the original image. Overall, the method provides only small payloads and is not suitable for general data embedding.

Macq described a modification to the patchwork algorithm to achieve lossless embedding of a watermark. He also used addition modulo 256 and essentially embedded a one-bit watermark. It is unclear if this technique could be used for authentication or general data embedding with practical payloads. (B. Macq, "Lossless Multiresolution Transform for Image Authenticating Watermarking" *Proc. EUSIPCO* (Tampere, Finland, September 2000)).

Thus there is a need for simple, high-capacity techniques that do not introduce visible artifacts and, at the same time, remove the distortion inherent in the embedding of a hidden message in a cover object, where the cover object itself is the object of interest. It is also important that the techniques be general enough to apply to all object types, including images, video, audio, and other binary files comprising digital samples. In the case of digital images, the technique should be applicable to all image formats, including uncompressed formats, such as BMP, PGM, PCX, etc., palette formats, such as GIF, PNG, and lossy formats, such as JPEG, JPEG2000, wavelet formats, fractal formats, etc.

OBJECTS AND SUMMARY OF THE INVENTION

An object of the present invention is to provide a simple and elegant lossless technique to embed data in a digital object, such as an image, video, or audio, in an arbitrary format.

A further object of the present invention is to provide a simple and elegant lossless technique to embed data in a digital object that allows relatively large payloads.

Still a further object of the present invention is to provide a simple and elegant lossless technique to embed data in an object that allows relatively large payloads while making very small modifications to the digital object Briefly stated, the present invention provides high-capacity embedding of data that is lossless (or distortion-free). Current methods of embedding hidden data in an image inevitably distort the original image by noise. This distortion cannot generally be removed completely because of quantization, bit-replacement, or truncation at the grayscales 0 and 255. The distortion, though often small, may make the original image unacceptable for medical applications, or for military and law enforcement applications where an image must be inspected under unusual viewing conditions (e.g., after filtering or extreme zoom). High-capacity embedding of data that is lossless (or distortion-free) is effected by the present invention because, after embedded information is extracted from a cover image, we revert to an exact copy of the original image before the embedding took place. This new technique is a powerful tool for a variety of tasks, including distortion-free robust watermarking, lossless authentication with fragile watermarks, and steganalysis.

According to an embodiment of the invention, a method for losslessly embedding a message into a digital object comprised of samples comprises the steps of: extracting from the object a first subset that is losslessly compressible; the first subset having the property that it can be randomized while preserving the perceptual quality of the object; compressing the first subset into a compressed bitstream; concatenating the compressed bitstream with the message to form a second subset; inserting the second subset into the object in place of the first subset to form a transformed object, whereby the message is effectively transmitted and extracted by transmitting the transformed object and extracting the second subset therefrom; and restoring the object by decompressing the compressed bitstream, restoring the first subset, and reinserting the first subset into the object.

According to a feature of the invention, a method for losslessly embedding a message into a digital object comprised of samples, each of the samples having an original value, comprises the steps of: defining a first set S(x), whose values are equal to x, as a first subset of samples from the object; defining a second set S(y), whose values are equal to y, as a second subset of samples from the object; assigning a first value to x and a second value to y, wherein the values x and y are close together and the first and second subsets S(x) and S(y) differ substantially in size; scanning the object in a defined pattern, whereby members of S(x) and S(y) are losslessly compressed to form a bitstream; concatenating the bitstream with the message and embedding a concatenation into a union of the first and second subsets S(x) and S(y) by scanning the object in the defined pattern and choosing the first value to embed an x and the second value to embed a y, whereby the message is effectively transmitted and extracted by transmitting the concatenation and extracting the second message therefrom; and restoring the object by decompressing the concatenation, scanning the object in the defined pattern, and restoring the original values in the object.

According to another feature of the invention, apparatus for losslessly embedding a message into a digital object comprised of samples comprises: means for extracting from the object a first subset that is losslessly compressible; the first subset having the property that it can be randomized while preserving the perceptual quality of the object; means for compressing the first subset into a compressed bitstream; means for concatenating the compressed bitstream with the message to form a second subset; means for inserting the second subset into the object in place of the first subset to form a transformed object, whereby the message is effectively transmitted and extracted by transmitting the transformed object and extracting the second subset therefrom; and means for restoring the object by (1) decompressing the compressed bitstream, (2) restoring the first subset, and (3) reinserting the first subset into the object.

According to still another feature of the invention, apparatus for losslessly embedding a message into a digital object comprised of samples, each of the samples having an original value, comprises: means for defining a first set S(x), whose values are equal to x, as a first subset of samples from the object; means for defining a second set S(y), whose values are equal to y, as a second subset of samples from the object; means for assigning a first value to x and a second value to y, wherein the values x and y are close together and the first and second subsets S(x) and S(y) differ substantially in size; means for scanning the object in a defined pattern, whereby members of S(x) and S(y) are losslessly compressed to form a bitstream; means for concatenating the bitstream with the message and embedding a concatenation into a union of the first and second subsets S(x) and S(y) by scanning the object in the defined pattern and choosing the first value to embed an x and the second value to embed a y, whereby the message is effectively transmitted and extracted by transmitting the concatenation and extracting the second message therefrom; and means for restoring the object by (1) decompressing the concatenation, (2) scanning the object in the defined pattern, and (3) restoring the original values in the object.

According to still yet another feature of the invention, a computer-readable storage medium embodying program instructions for a method for losslessly embedding a message into a digital object comprised of samples, comprises the steps of: extracting from the object a first subset that is losslessly compressible; the first subset having the property that it can be randomized while preserving the perceptual quality of the object; compressing the first subset into a compressed bitstream; concatenating the compressed bitstream with the message to form a second subset; inserting the second subset into the object in place of the first subset to form a transformed object, whereby the message is effectively transmitted and extracted by transmitting the transformed object and extracting the second subset therefrom; and restoring the object by decompressing the compressed bitstream, restoring the first subset, and reinserting the first subset into the object.

According to an additional feature of the invention, a computer-readable storage medium embodying program instructions for a method for losslessly embedding a message into a digital object comprised of samples, each of the samples having an original value, comprises the steps of: defining a first set S(x), whose values are equal to x, as a first subset of samples from the object; defining a second set S(y), whose values are equal to y, as a second subset of samples from the object; assigning a first value to x and a second value to y, wherein the values x and y are close together and the first and second subsets S(x) and S(y) differ substantially in size; scanning the object in a defined pattern, whereby members of S(x) and S(y) are losslessly compressed to form a bitstream; concatenating the bitstream with the message and embedding a concatenation into a union of the first and second subsets S(x) and S(y) by scanning the object in the defined pattern and choosing the first value to embed an x and the second value to embed a y, whereby the message is effectively transmitted and extracted by transmitting the concatenation and extracting the second message therefrom; and restoring the object by decompressing the concatenation, scanning the object in the defined pattern, and restoring the original values in the object.

The present invention solves the problem of how to embed a large payload in a digital object in a lossless (i.e., invertible) manner so that, after the payload bits are extracted, the object can be restored to the form it had originally, before embedding. Even though the distortion is completely invertible, the present invention pays close attention to minimizing the amount of the distortion after embedding a hidden message. The invention is applicable to all image formats and to any other object that comprises digital samples, such as an audio file.

In this application, the expressions "distortion-free", "invertible", and "lossless" are synonymous. Other terms, such as "erasable" and "removable", have been used in the scientific literature (see I. Cox et al., *Digital Watermarking* (San Francisco, 2001).

The ability to embed data in a digital object in a lossless manner, without having to expand the object or append the data, is quite useful. Data embedded in a header or a separate file can be easily lost when the file's format is converted or the file is saved under a different name. Additional information embedded directly in the object, for example, as additional lines or columns in an image, is obvious and will cause visually disturbing artifacts. Adding information also increases the size of the object file. In contrast, information that is embedded in the object according to the present invention is not modified by format conversion or by saving. Moreover, for uncompressed formats, communicating the additional information by the present invention requires no increase in bandwidth. Finally, the embedded information is so inconspicuous and imperceptible in the present invention that one gains great security. For even greater security, a secret key can protect the embedding process.

The above, and other features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
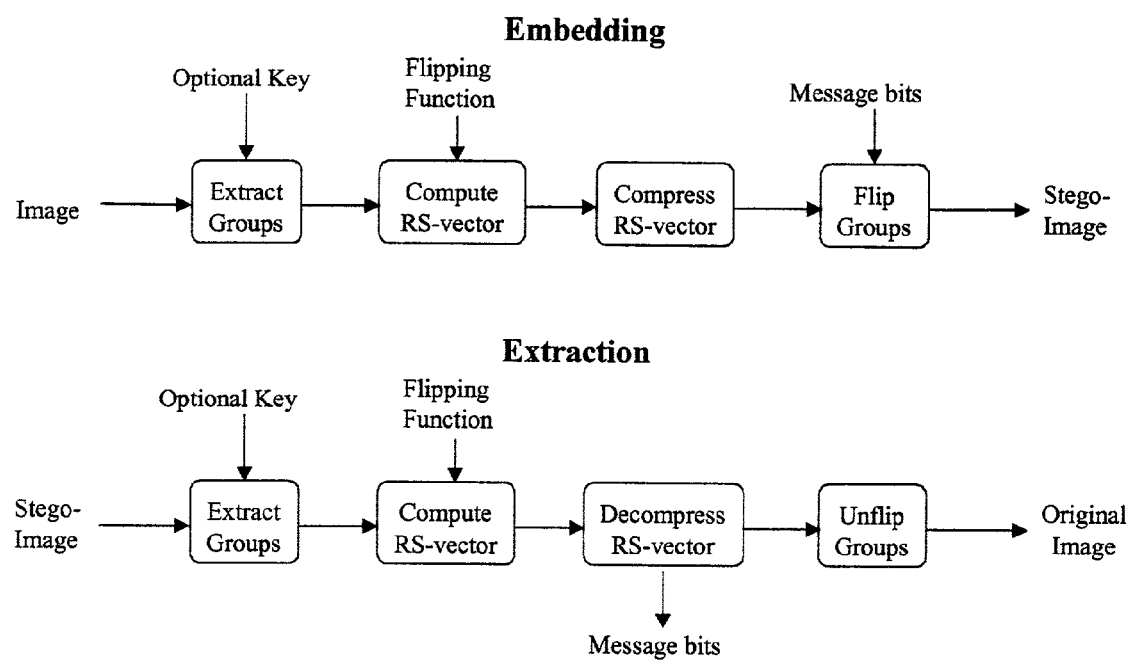
FIG. 1 is a flow chart of the actions in going from an image to a stego-image in the techniques of the present invention.

Techniques of embedding data in a digital object cannot be completely reversed because of the loss of information from discarded (i.e., replaced) information, quantization, and truncation of sample values to a finite dynamic range (e.g., truncation to the range 0–255 for grayscale images). Most techniques for embedding high-capacity data in a digital object are based on either bit-replacement or quantization. These techniques offer little hope for embedding data without permanently distorting the digital object in which the data are embedded. Additive non-adaptive watermarks are almost lossless, except for those samples with values close to the boundary of the finite dynamic range, where truncation can occur. Modulo addition, as proposed in Honsinger et al., supra; Fridrich et al., "Invertible Authentication", supra; can solve the problem only at the expense of introducing very visible artifacts. Another drawback of lossless data embedding based on additive robust watermarks is that they provide a very limited payload.

Fridrich et al., supra, proposed an invertible fragile watermark to authenticate an image based on lossless compression of bit-planes. The idea behind this technique is to "make some space" in the image by losslessly compressing a bit-plane with some minimal compressible structure. The newly created space can contain an additional embedded message. However, higher payloads force us to use higher bit-planes, thus quickly increasing the distortion in the image beyond an acceptable level.

The present invention offers two general techniques for lossless data embedding in digital objects.

Technique I

The first is based on lossless compression of subsets or features of the samples comprising the digital object. Let us denote the digital object as X. X is a collection of samples, usually obtained by digitizing an analog signal (e.g., image, video, audio file, SAR image) or a collection of samples obtained through measurements or computer simulations, such as three-dimensional mesh structures. If the object X contains a subset B, or if we can derive a set of features B from X with the following two properties, lossless data embedding is possible.

Property 1: B can be losslessly compressed (i.e., B has a losslessly compressible structure).

Property 2: B can be randomized while preserving the perceptual quality of object X.

This technique starts with extracting subset B and continues with losslessly compressing it. The compressed bitstream is concatenated with a secret message (payload) and inserted into object X in place of subset B. Property 2 above guarantees that object X will not be perceptibly disturbed, and Property 1 guarantees that the embedding method is lossless. The extraction of the hidden message proceeds by extracting subset B and reading the concatenated bit stream comprising the compressed bitstream and the message. The compressed bitstream is decompressed, and the original subset B is restored and reinserted into X. Thus the original object X is obtained.

The work of Fridrich et al., supra; provides an example of this technique. The object X is the set of all possible grayscale values from a grayscale image. The subset B is the set of all bits from a fixed bitplane. Lossless compression of the bitplane enables lossless data embedding as long as the bitplane is low enough so that replacing it with a compressed bitstream of itself and the message do not introduce visible artifacts. A similar technique could embed information in JPEG images (J. Fridrich et al., "Invertible Authentication Watermark for JPEG Images," Proc. ITCC 2001, Las Vegas, Apr. 2–4, 2001, Nev., USA) or in audio files.

Technique II

The second technique of the present invention for lossless data embedding is also based on the presence of subsets with specific properties in digital object X. Object X comprises a collection of samples (numerical values x). For each sample value x, we define the sample set S(x) as the subset of samples from X whose values are equal to x. For example, for a digital image, S(123) is the set of all pixels with grayscale value equal to 123. Let us assume that we can identify two sample values x and y that are close to each other (i.e., the absolute value of the difference x−y is small) but whose sample sets differ significantly in size:

the absolute value of |S(x)|−|S(y)| is large.

The symbol |S(x)| means the number of elements in the subset S(x). The next step in lossless data embedding is losslessly compressing the bitstream Z of elements S(x) and S(y) while assigning, for example, a "0" to x and "1" to y and scanning object X in a defined pattern. For example, we scan a digital image by rows and losslessly compress a bitstream Z of values x (stands for a "0") and y (stands for a "1") as the image is scanned. Once we obtain this compressed bitstream, we concatenate it with a secret message (payload) and embed the result into the union of subsets S(x) and S(y) by scanning object X in the same pattern and choosing the sample value x if a "0" should be embedded and the sample value y if a "1" should be embedded. Embedding will not disturb object X significantly because the difference between value x and value y is small. At the same time, because subsets S(x) and S(y) differ in size, bitstream Z will be compressible, which will enable us to embed a payload losslessly. The larger the difference |x−y|, the larger the distortion from embedding. And the more compressible the bitstream Z, the larger the payload. We also note that naturally occurring structures in digital object X may enable lossless embedding even when the difference in size between S(x) and S(y) is small. In general, the technique works whenever bitstream Z is compressible.

The message extraction proceeds by extracting the concatenated bitstream, reading the payload, and decompressing the compressed bitstream Z. Once the decompressed bit stream Z is obtained, we scan the object in the same defined pattern as we did during the embedding, and we restore the original sample values x and y to their appropriate places in X.

All the techniques of the present invention, which cover image formats (BMP, JPEG, and GIF), can now be stated as special cases of the two techniques described above.

Uncompressed Image Formats (BMP, PCX, PGM, etc.)

This embodiment uses Technique I. We generate losslessly compressible subsets B by adding invertible noise (flipping) and applying special discrimination (prediction) functions to small groups of pixels.

Let us assume an original grayscale image with M×N pixels that have values from the set P, for example, for an 8-bit grayscale image, P={0, . . . , 255}. We divide the image into disjoint groups of n adjacent pixels $(x_1, \ldots, x_n)$. For example, we can choose groups of n=4 consecutive pixels in a row. We also define a discrimination function $f$ that assigns a real number $f(x_1, \ldots, x_n)$ to each pixel group $G=(x_1, \ldots, x_n)$. The discrimination function captures the smoothness (or regularity) of the group of pixels G.

We design discrimination functions from models of or statistical assumptions about the original image. For example, we choose the 'variation' of the group of pixels $(x_1, \ldots, x_n)$ as the discrimination function $f$:

$$f(x_1, x_2, \ldots, x_n) = \sum_{i=1}^{n-1} |x_{i+1} - x_i| \qquad (1)$$

Finally, we define an invertible operation F on P called "flipping". Flipping is a permutation of gray levels that consists of 2-cycles. Thus, F will have the property that $F^2$=Identity or $F(F(x))=x$ for all $x$ in $P$.

We use the discrimination function $f$ and the flipping operation F to define three types of pixel groups: R, S, and U Regular groups: $G \in R \Leftrightarrow f(F(G)) > f(G)$ Singular groups: $G \in S \Leftrightarrow f(F(G)) < f(G)$ Unusable groups: $G \in U \Leftrightarrow f(F(G)) = f(G)$.

In the expression F(G), the flipping function F is applied to all (or selected) components of the vector $G=(x_1, \ldots, x_n)$. The noisier the group of pixels $G=(x_1, \ldots, x_n)$, the larger the value of the discrimination function becomes. The purpose of flipping function F is to perturb the pixel values in an invertible way by some small amount, thus simulating the act of adding invertible noise. In typical pictures, adding a small amount of noise (i.e., flipping by a small amount) leads to an increase rather than a decrease in the discrimination function. Although this bias may be quite small, it will enable us to embed a large amount of information in an invertible manner.

As explained above, F is a permutation that consists entirely of 2-cycles. For example, the permutation $F_{LSB}$ defined as 0↔1, 2↔3, . . . , 254↔255 corresponds to flipping (negating) the LSB of each grayscale level. The permutation 0 ↔2, 1↔3, 4↔6, 5↔7, . . . corresponds to an invertible noise with an amplitude of two. Many flipping permutations are possible, including those in which the flipping is irregular, that is, with several different changes in gray scales rather than just one.

A useful numerical characteristic for the flipping permutation F is its amplitude A, defined as the average change of x when F is applied:

$$A = \frac{1}{|P|} \sum_{x \in P} |x - F(x)| \qquad (2)$$

For $F_{LSB}$ the amplitude is 1. The other permutation from the previous paragraph has A=2. Larger values of the amplitude A correspond to adding more noise after applying F.

Let us now denote the number of regular, singular, and unusable groups in the image as $N_R$, $N_S$, and $N_U$, respectively. We have $N_R+N_S+N_U=MN/n$. Because real images have spatial structures, we expect a bias between the number of regular groups and singular groups: $N_R>N_S$. As we show below, this bias enables us to losslessly embed data. We note further that if G is regular, F(G) is singular, if G is singular, F(G) is regular, if G is unusable, F(G) is unusable.

Thus, the R and S groups are flipped into each other under the flipping operation F, while the unusable groups U do not change their status. In symbolic form, F(R)=S, F(S)=R, and F(U)=U.

We can now formulate the technique of the present invention. By assigning a 1 to R and a 0 to S, we embed one message bit in each R or S group. If the message bit and the group type do not match, we apply the flipping operation F to the group to obtain a match. We cannot use all R and S groups for the payload, because we need to be able to revert to the exact original image after we extract the data at the receiving end.

We solve this problem as follows. Before the embedding starts, we scan the image by groups and losslessly compress the status of the image—the bit-stream of R and S groups (the RS-vector), simply skipping the U groups. We do not need to include the U groups, because they do not change when we embed a hidden message. Thus they can all be unambiguously identified and skipped during embedding and extraction. We take the compressed RS-vector C, append the message bits to it, and embed the resulting bit-stream in the image by the process described above.

At the receiving end, the user simply extracts the bit-stream from all R and S groups (R=1, S=0) by scanning the image in the same order as during the embedding. The extracted bit-stream is separated into the message and the compressed RS-vector C. The bit-stream C is decompressed to reveal the original status of all R and S groups. The image is then processed, and the status of all groups is adjusted as necessary by flipping the groups back to their original state. Thus, the exact copy of the original image is obtained. FIG. 1 shows the block diagram of the embedding and extracting procedures.

The raw information capacity for the technique of the present invention is $N_R+N_S=MN/n-N_U$ bits. However, because we need to store the message and the compressed bit-stream C, the real capacity Cap that can be used for the message is $$Cap = N_R + N_S - |C|,$$

where |C| is the length of the bit-stream C. As the bias between R and S groups increases, the compressed bit-stream C becomes shorter and the capacity higher. An ideal lossless context-free compression scheme (e.g., the entropy coder; see K. Sayood, *Introduction to Data Compression* (San Francisco, 1996), 87–94) compresses the RS-vector consisting of $N_R+N_S$ bits using bits.

$$-N_R \log\left(\frac{N_R}{N_R+N_S}\right) - N_S \log\left(\frac{N_S}{N_R+N_S}\right)$$

As a result, we obtain a theoretical estimate (an upper bound) Cap' for the real capacity $$Cap = N_R + N_S + N_R \log\left(\frac{N_R}{N_R+N_S}\right) + N_S \log\left(\frac{N_S}{N_R+N_S}\right)$$

This estimate will be positive whenever there is a bias between the number of R and S groups, or when $N_R > N_S$. This bias is influenced by the size and shape of the group G, the discrimination function $f$, the amplitude of the invertible noisy permutation F, and the content of the original image. The bias increases with the group size n and the amplitude of the permutation F. Smoother and less noisy images lead to a larger bias than images that are highly textured or noisy.

However, the bias is not the parameter to optimize for this technique. The real capacity Cap is the characteristic to maximize to obtain the best performance. Our goal is to choose such a combination of the group size n and its shape, the permutation F, and the discrimination function $f$, to maximize the capacity while keeping the distortion to the image as small as possible.

We have performed a number of experiments to see how capacity and distortion change with different group sizes and shapes, discrimination functions $f$, and flipping operations F. We obtained the unexpected result that relatively small groups (n=4) had the highest capacity. Another surprising observation was that a quite reasonable capacity could be obtained from the flipping permutation $F_{LSB}$ that influences only the LSBs. And this was true for all images including those that did not show any structure in their LSB plane.

TABLE 1

Figure 2:
FIG. 2 is a series of ten gray-scale images used to test a technique of the present invention.

Estimated capacity Cap' for the ten grayscale test images of FIG. 2 as a function of the amplitude a.

| Test image name (MN) | Capacity Cap' for amplitudes a = 1, . . . , 7 | | | | | | |
|---|---|---|---|---|---|---|---|
| | 1 | 2 | 3 | 4 | 5 | 6 | 7 |
| LennaFace (128128) | 170 | 521 | 1045 | 1390 | 1865 | 1996 | 2342 |
| Lenna (256256) | 1038 | 2916 | 5095 | 6027 | 7663 | 7783 | 8988 |
| PalmTrees (400268) | 916 | 2274 | 4020 | 4621 | 5778 | 6643 | 7971 |
| GoldenGate (400268) | 4325 | 8930 | 14001 | 14351 | 16865 | 16460 | 18341 |
| Mountains (400268) | 1656 | 3790 | 6426 | 7575 | 9602 | 10432 | 12149 |
| Desert (400268) | 7133 | 10935 | 17170 | 16959 | 19134 | 18568 | 20095 |
| Mandrill (512512) | 186 | 702 | 1810 | 2905 | 4398 | 5664 | 7643 |
| ElCapitan (592800) | 2500 | 12219 | 18898 | 26627 | 36774 | 42133 | 51430 |
| NYC (1024768) | 6773 | 17766 | 30883 | 37516 | 48434 | 52553 | 61614 |
| Girl (10241536) | 25506 | 65577 | 109865 | 131994 | 166806 | 176587 | 204761 |
| Average Cap'/MN | 1.88% | 4.11% | 6.86% | 7.82% | 9.72% | 10.16% | 11.73% |
| Average PSNR (dB) | 53.12 | 46.67 | 42.84 | 39.27 | 38.26 | 36.06 | 35.32 |

Table 1 shows how the amplitude of the flipping function influences the capacity Cap and the distortion for the ten grayscale images shown in FIG. 2. We used groups of n=4 consecutive pixels and seven flipping operations with amplitudes ranging from 1 to 7. We can see a very high variability in capacity between images. Images with abundant highly textured areas and noisy images generally have smaller capacity. The capacity increases very fast with amplitude. To give an idea about the (invertible) distortion introduced by this lossless scheme, we also show the Peak Signal to Noise Ratio (PSNR) in the last row of Table 1. The PSNR is defined as $-20 \log_{10}(A/MSE)$, where A is the peak signal amplitude (in our case 256) and MSE is the mean square error, or the squares of differences in pixel values summed over the whole image. Distortion with a PSNR over 40 dB is considered imperceptible to the human eye. PSNR between 35 dB and 40 dB may be faintly visible in some areas of the image but is generally not disturbing.

Figure 3:
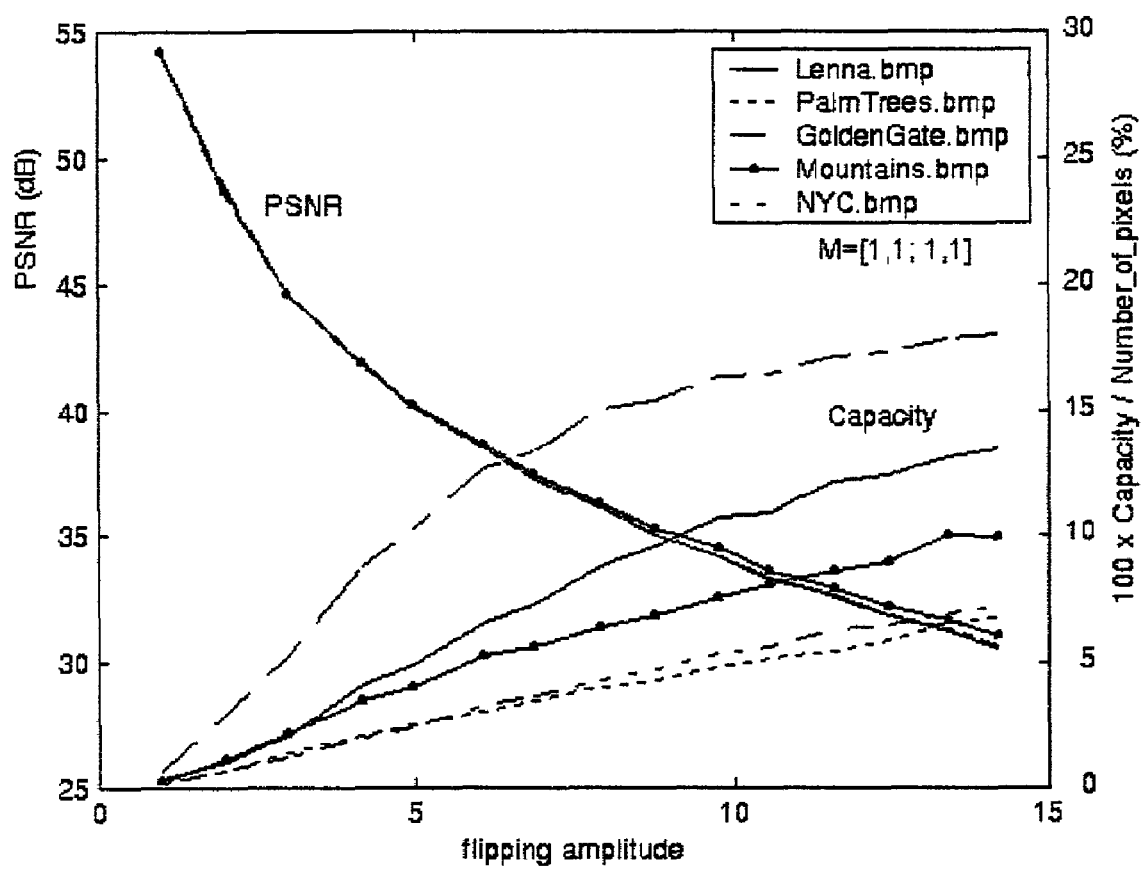
FIG. 3 plots the capacity (as a percentage of the total number of pixels) and the Peak Signal to Noise Ratio (PSNR) as functions of the amplitude of the flipping function for five of the images in FIG. 2.

One of the objects of the present invention is to maximize the capacity while keeping the invertible distortion as small as possible. There are several factors that influence the trade-off between capacity and distortion—the discrimination function, the flipping operation, and the size and shape of the groups. The influence of the amplitude of the flipping operation is clear. The capacity increases rapidly with the amplitude, as shown in Table 1 and in FIG. 3. The role of the size and shape of the groups as well as the choice of the discrimination function is more complicated. Further details can be found in J. Fridrich et al., "Distortion-Free Data Embedding in Images," 1736 *Lecture Notes on Computer Science* (Springer-Verlag, New York, to be published).

The technique for lossless data embedding in uncompressed formats described above can be formulated in an even more general setting. Assume a grayscale image, disjoint groups of n pixels, and a flipping operation F applied to selected pixels in the group. Let S be the set of all possible states of each group consisting of $256^n$ n-tuples of integers from the set of grayscales P. The flipping operation F separates S into pairs of states x, y∈S, that are flipped into each other F(x)=y, F(y)=x. Further assume an image model that determines whether x or y is more likely to occur in natural images. We denote the group G as regular if state x is more likely to occur; singular, if state x is less likely to occur, and unusable if the image model cannot determine whether x or y is more likely. The rest of the embedding and extraction of data is the same as described in TECHNIQUE I above. Under this interpretation, the discrimination function (1) is a special case of an embodiment of an image model derived from assuming that groups with smaller variance are more likely to occur than groups with higher variance.

Lossy Image Formats (JPEG)

TECHNIQUE I can also apply directly to images in the JPEG format. In this application, we explain the technology on grayscale images. Extension to color images is straightforward.

JPEG compression starts with dividing the image into disjoint blocks of 8×8 pixels. For each block, we calculate the discrete cosine transform (DCT), thereby producing 64 DCT coefficients. Let us denote the (i,j)th DCT coefficient of the kth block as $d_k(i,j)$, i,j=0, . . . , 64, k=1, . . . , B, where B is the total number of blocks in the image. In each block, all 64 coefficients are further quantized to integers $D_k(i,j)$ with a JPEG quantization matrix Q $$D_k(i,j) = \text{integer\_round}\left(\frac{d_k(i,j)}{q(i,j)}\right)$$

The quantized coefficients are arranged in a zig-zag manner and compressed using the Huffman coder. The resulting compressed stream, together with a header, forms the final JPEG file.

The largest DCT coefficients occur for the lowest frequencies (small i and j). Both the properties of typical images and quantization make the quantized DCT coefficients that correspond to higher frequencies have a large number of zeros or small integers, such as 1 or −1. For example, for the classical grayscale test image 'Lenna' with 256×256 pixels, the DCT coefficient (5,5) is zero in 94.14% of all blocks. In 2.66% cases it is a 1, and in 2.81% cases it is equal to −1, with less than 1% of coefficients equal to 2 or −2. Thus, the sequence $D_k(5,5)$ forms a subset B that is easily compressible with a simple Huffman or arithmetic coder. Furthermore, if we embed message bits into the LSBs of the coefficients $D_k(5,5)$, we need to compress only the original LSBs of the sequence $D_k(5,5)$ instead of the whole sequence. We can further improve efficiency if we define the LSB of negative integers $D_k<0$ as $LSB(D_k)=1-(|D_k| \bmod 2)$. Thus, LSB(1)=LSB(3)=0, and LSB(2)=LSB(4)=1, etc. Because DCT coefficients $D_k$ have a symmetrical distribution with zero mean, this simple measure will increase the bias between zeros and ones in the LSB bit-stream of original DCT coefficients.

DCT coefficients $D_k(i,j)$ that correspond to higher-frequencies produce a set B with a larger bias between zeros and ones. Because the quantization factor Q(i,j) is also higher for such coefficients, the distortion in each modified block will also be higher. To obtain the best results, one chooses different DCT coefficients for different JPEG quality factors to minimize the overall distortion and avoid introducing easily detectable artifacts.

We give below pseudo code for lossless data embedding in grayscale JPEG files.

1. Based on the JPEG quality factor, determine the set of L authentication pairs $(i_1,j_1), (i_2,j_2), \ldots, (i_L,j_L)$, $i_l,j_l=1, \ldots, 64$, in middle frequencies. A good overall choice are the coefficients (5,5),(4,5),(5,4),(3,5), . . . For short messages, just one coefficient may be enough (L=1). Larger messages may require using more pairs, L>1. DCT coefficients $D_k(i,j)$ corresponding to higher-frequencies will produce a set of LSBs with a larger bias between zeros and ones. Because the quantization factor Q(i,j) is also higher for such coefficients, the distortion will also be more visible. To obtain the best results, one uses different DCT coefficients for different JPEG quality factors to minimize the overall distortion and avoid introducing easily detectable artifacts.

2. Read the JPEG file and use a Huffman decompressor to obtain the values of quantized DCT coefficients, $D_k(i,j)$, $0 \leq i,j \leq 64$, k=1, . . . , B, where B is the total number of blocks in the image.

3. Seed a pseudo-random number generator (PRNG) with a secret key and follow a random non-intersecting walk through the set S={$D_1(i_1,j_1), \ldots, D_B(i_1,j_1), D_1(i_2,j_2), \ldots, D_B(i_2,j_2), \ldots, D_1(i_L,j_L), \ldots, D_B(i_L,j_L)$}. There are L×B elements in this set.

4. While following the random walk, carry out an adaptive context-free lossless arithmetic compression for the least significant bits of the coefficients from S (realize that the LSB of negative coefficients is negated, i.e., LSB(−2)=1, LSB(−3)=0, etc.). While compressing, check for the difference between the length of the compressed bit-stream C and the number of processed coefficients. Once the difference between these two numbers becomes larger than the message to be embedded, stop the compression. Denote the set of visited coefficients as $S_1$, where $S_1$ is a subset of S.

5. Concatenate the compressed bit-stream C and the message M and insert the resulting bit-stream into the least significant bits of the coefficients from $S_1$. Huffman compress all DCT coefficients $D_k(i,j)$ including the modified ones and store the authenticated (watermarked) image as a JPEG file on a disk.

Data Extraction and Recovery of the Original Image:

1. Based on the JPEG quality factor, determine the set of L authentication pairs $(i_1,j_1), (i_2,j_2), \ldots, (i_L,j_L)$, $i_l,j_l=1, \ldots, 64$.

2. Read the JPEG file and use a Huffman decompressor to obtain the values of quantized DCT coefficients, $D_k(i,j)$, $i,j=1, \ldots, 64, k=1, \ldots, B$.

3. Seed a PRNG with a secret key and follow a random non-intersecting walk through the set $S=\{D_1(i_1,j_1), \ldots, D_B(i_1,j_1), D_1(i_2,j_2), \ldots, D_B{}_{(i2,j2)}, \ldots, D_1(i_L,j_L), \ldots, D_B(i_L,j_L)\}$.

4. While following the random walk, carry out context-free lossless arithmetic decompression for the least significant bits of the coefficients visited during the random walk. Once the length of the decompressed bit-stream reaches the number of 8×8 blocks in the image plus the number of bits in the message, stop the procedure.

5. Separate the decompressed bit-stream into the LSBs of visited DCT coefficients and the extracted message M. Read the message M. Replace the LSBs of all visited coefficients with the decompressed bit-stream to obtain the original stream of DCT coefficients.

The selection of the L authentication coefficients can be adjusted according to the quality factor to minimize the distortion and other artifacts. For example, using L=3 coefficients (5,5), (4,6), and (6,3) in a random fashion will contribute to the overall security of the scheme because the statistical artifacts from lossless authentication will be more difficult to detect.

For color JPEG images, using the chrominance instead of the luminance introduces much less visible distortion into the image.

In another embodiment, lossless data embedding in JPEG files is based on the following. If, for a given DCT coefficient (i,j) the quantization factor Q(i,j) is even, we divide it by two and multiply all coefficients $D_k(i,j)$ by two without changing the visual appearance of the image at all. Because all $D_k(i,j)$ are now even, we can embed any binary message into the LSBs of $D_k(i,j)$, and this LSB embedding will be trivially invertible.

If Q(i,j) is odd, we replace it with floor(Q(i,j)/2), where floor(x) is the largest integer smaller than or equal to x, and we multiply all $D_k(i,j)$ by two. In this case, we include a flag to the hash telling us that Q(i,j) was originally odd in order to reconstruct the original JPEG stream during verification. Because this method uses a non-standard quantization table, the table must be included in the header of the authenticated image. Because the table entry Q(i,j) will not be compatible with the rest of the table, this authentication method is steganographically obvious.

There are several possible variations of the above embodiment. For example, replace Q(i,j) with a 1 instead of its half and multiply each $D_k(i,j)$ with Q(i,j). This variation introduces a very small distortion, because the DCT coefficients used for embedding have a quantization factor equal to 1. On the other hand, the modified stream of quantized coefficients will be less compressible by the Huffman coder, thus worsening the overall compression ratio. Further details of this approach can be found in Fridrich et. al., "Invertible Authentication Watermark for JPEG Images", *Proc. ITCC*, Las Vegas, April, 2001.

Palette Image Formats (GIF, PNG)

TECHNIQUE II can be applied directly to palette images. The image X consists of pointers x to the palette containing at most 256 colors. Thus the sample sets S(x) are formed by those pixels with colors that correspond to the pointer x.

Lossless Authentication of Objects Stored in Uncompressed Formats (BMP, PCX, PGM, etc.)

With the present invention, we build a distortion-free fragile authentication watermark in the following manner. We calculate the hash of the whole cover object and embed it in the object by the lossless embedding of the present invention. Because the hash is a short bit-string, we can do this for most objects with $F_{LSB}$ flipping permutation. The distortion introduced with this method is very low, with PSNR often exceeding 60 dB for images. We select by a secret key a random walk over the sample groups and also to encrypt the hash. We verify the object's integrity by extracting the hash and the compressed bit-stream. From the latter we obtain the original object, whose hash is then compared with the extracted hash. In case of a match, the object is deemed authentic, otherwise it is not.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for losslessly embedding a message into a digital object comprised of samples, said method comprising the steps of:

extracting from said object a first subset; having the property that it can be randomized while preserving the perceptual quality of said object;

applying a discrimination function to portions of the first subset to classify a regularity of said portion, said discrimination function for a plurality of portions being represented as a vector;

reversibly modifying said first subset based on said message and said discrimination function;

losslessly compressing said modified first subset and said vector to form a second subset;

inserting said second subset into said object in place of said first subset to form a transformed object, whereby said message is effectively transmitted and extracted by transmitting said transformed object and extracting said second subset therefrom; and restoring said object by decompressing said compressed bitstream, restoring said first subset, and reinserting said first subset into said object.

2. The method of claim 1, wherein said digital object is an uncompressed image.

3. The method of claim 1, wherein said digital object is an image in a lossy image format.

4. The method of claim 1, wherein said digital object is an audio file or a video file.

5. The method of claim 1, wherein said first subset comprises all bits from a fixed bitplane.

6. The method of claim 1, wherein said discrimination function defines three classes of portions, a first class of portions have a regularity equal to a threshold, a second class of portions have a regularity below a threshold, and a third class of portions have a regularity above a threshold; and said modifying comprises selectively altering said second class and said third class of portions in a predetermined manner in dependence on their respective class, while leaving said first class unaltered.

7. The method of claim 1, wherein said message is a digital watermark.

8. The method of claim 1, wherein said message is an authentication code.

9. Apparatus for losslessly embedding a message into a digital object comprised of samples, said apparatus comprising:
- means for extracting from said object a first subset having the property that it can be randomized while preserving the perceptual quality of said object;
- means for applying a discrimination function to portions of the first subset to classify a regularity of said portion, said discrimination function for a plurality of portions being represented as a vector;
- means for reversibly modifying said first subset based on said message and said discrimination function;
- means for losslessly compressing said modified first subset and said vector to form a second subset;
- means for inserting said second subset into said object in place of said first subset to form a transformed object, whereby said message is effectively transmitted and extracted by transmitting said transformed object and extracting said second subset therefrom; and
- means for restoring said object by (1) decompressing said compressed bitstream, (2) restoring said first subset, and (3) reinserting said first subset into said object.

10. Apparatus as in claim 9, wherein said digital object is an uncompressed image.

11. Apparatus as in claim 9, wherein said digital object is an image in a lossy image format.

12. Apparatus as in claim 9, wherein said digital object is an audio file or a video file.

13. Apparatus as in claim 9, wherein said first subset comprises all bits from a fixed bitplane.

14. Apparatus as in claim 9, wherein said discrimination function defines three classes of portions, a first class of portions have a regularity equal to a threshold, a second class of portions have a regularity below a threshold, and a third class of portions have a regularity above a threshold; and said means for modifying selectively alters said second class and said third class of portions in a predetermined manner in dependence on their respective class, while leaving said first class unaltered.

15. Apparatus as in claim 9, wherein said message is a digital watermark.

16. Apparatus as in claim 9, wherein said message is an authentication code.

17. A computer-readable storage medium embodying program instructions for a method for losslessly embedding a message into a digital object comprised of samples, said method comprising the steps of:
- extracting from said object a first subset having the property that it can be randomized while preserving the perceptual quality of said object;
- applying a discrimination function to portions of the first subset to classify a regularity of said portion, said discrimination function for a plurality of portions being represented as a vector;
- reversibly modifying said first subset based on said message and said discrimination function; losslessly compressing said modified first subset and said vector to form a second subset;
- inserting said second subset into said object in place of said first subset to form a transformed object, whereby said message is effectively transmitted and extracted by transmitting said transformed object and extracting said second subset therefrom; and
- restoring said object by decompressing said compressed bitstream, restoring said first subset, and reinserting said first subset into said object.

* * * * *

UNITED STATES PATENT AND TRADEMARK OFFICE
CERTIFICATE OF CORRECTION

PATENT NO. : 7,006,656 B2
DATED : February 28, 2006
INVENTOR(S) : Fridrich et al.

It is certified that error appears in the above-identified patent and that said Letters Patent is hereby corrected as shown below:

<u>Title page,</u>
Item [73], should read -- Assignee: The Research Foundation of SUNY, Binghamton, NY (US) --.

Signed and Sealed this

Ninth Day of May, 2006

JON W. DUDAS
*Director of the United States Patent and Trademark Office*